United States Patent
Yamamoto (10) Patent No.: US 12,351,199 B2
(45) Date of Patent: Jul. 8, 2025

(54) VEHICLE CONTROL DEVICE

(71) Applicant: TOYOTA JIDOSHA KABUSHIKI KAISHA, Toyota (JP)

(72) Inventor: Shinsuke Yamamoto, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 18/505,376

(22) Filed: Nov. 9, 2023

(65) Prior Publication Data
US 2024/0262373 A1    Aug. 8, 2024

(30) Foreign Application Priority Data

Feb. 7, 2023  (JP) ................... 2023-016939

(51) Int. Cl.
*B60W 50/00*   (2006.01)
*B60W 10/04*   (2006.01)
*B60W 10/184*  (2012.01)
*B60W 50/10*   (2012.01)

(52) U.S. Cl.
CPC ......... *B60W 50/10* (2013.01); *B60W 10/04* (2013.01); *B60W 10/184* (2013.01); *B60W 2510/186* (2013.01); *B60W 2510/30* (2013.01); *B60W 2540/10* (2013.01); *B60W 2540/12* (2013.01); *B60W 2710/18* (2013.01)

(58) Field of Classification Search
CPC .... B60W 50/10; B60W 10/04; B60W 10/184; B60W 2510/30; B60W 2540/10; B60W 2540/12; B60W 2710/18
See application file for complete search history.

(56) References Cited

U.S. PATENT DOCUMENTS

| | | | | |
|---|---|---|---|---|
| 9,365,208 | B2* | 6/2016 | Grover, Jr. ............ | B60W 10/06 |
| 11,414,090 | B2* | 8/2022 | Kim ....................... | B60W 10/18 |
| 2002/0189882 | A1* | 12/2002 | Eberling ............... | B60T 17/221 |
| | | | | 180/281 |
| 2004/0113486 | A1* | 6/2004 | Koga ..................... | B60T 13/66 |
| | | | | 303/20 |
| 2009/0124457 | A1* | 5/2009 | Nitta ..................... | B60T 7/14 |
| | | | | 477/93 |
| 2010/0286887 | A1* | 11/2010 | Maruyama ............. | B60T 7/22 |
| | | | | 701/96 |

(Continued)

FOREIGN PATENT DOCUMENTS

| | | | | |
|---|---|---|---|---|
| DE | 102013217986 A1 * | 8/2014 | ............ | B60K 28/04 |
| JP | H09-154201 A | 8/1997 | | |

(Continued)

*Primary Examiner* — Phutthiwat Wongwian
*Assistant Examiner* — Sherman D Manley
(74) *Attorney, Agent, or Firm* — SoraIP, Inc.

(57) ABSTRACT

In the vehicle control device, when the accelerator pedal is operated while the electric parking brake of the vehicle is operating, the determination unit determines, based on the open/closed state of the vehicle door, the wearing state of the seat belt, and the operating state of the brake pedal, It is determined whether the operation of the accelerator pedal is an erroneous operation. The control unit executes at least one of control for actuating the hydraulic brake of the vehicle and control for suppressing the driving force of the vehicle when it is determined that the operation of the accelerator pedal is an erroneous operation.

5 Claims, 6 Drawing Sheets

(56) References Cited

U.S. PATENT DOCUMENTS

| | | | | |
|---|---|---|---|---|
| 2014/0172240 A1* | 6/2014 | Schemmel | B60Q 9/00 | |
| | | | 701/49 | |
| 2016/0339888 A1* | 11/2016 | Yokoyama | F16D 65/18 | |
| 2017/0043752 A1* | 2/2017 | Stoloff | B60T 13/662 | |
| 2019/0217862 A1* | 7/2019 | Pursifull | B60W 10/06 | |
| 2020/0023823 A1* | 1/2020 | Baehrle-Miller | B60T 8/321 | |
| 2020/0101948 A1* | 4/2020 | Suzuki | B60T 17/22 | |
| 2022/0266819 A1* | 8/2022 | Itoh | B60W 30/18109 | |
| 2023/0242116 A1* | 8/2023 | Yamamoto | B60W 10/04 | |
| | | | 701/70 | |

FOREIGN PATENT DOCUMENTS

| | | |
|---|---|---|
| JP | 2009-101818 A | 5/2009 |
| JP | 2018-052267 A | 4/2018 |
| JP | 2018-065478 A | 4/2018 |

\* cited by examiner

VEHICLE CONTROL DEVICE

CROSS-REFERENCE TO RELATED APPLICATION

This application claims priority to Japanese Patent Application No. 2023-016939 filed on Feb. 7, 2023, incorporated herein by reference in its entirety.

BACKGROUND

1. Technical Field

The present disclosure relates to a vehicle control device.

2. Description of Related Art

Japanese Unexamined Patent Application Publication No. 2009-101818 (JP 2009-101818 A) discloses a technique in which, in a state in which an automatic operation is prohibited by an operation of an automatic operation prohibition switch, when a shift operation from a stop instruction position to a travel instruction position is performed, and an accelerator pedal operation is performed, a parking brake is automatically released. With this technique, even in a state in which the automatic operation is prohibited, when the driver's intention to start a vehicle is detected, the parking brake is released, so that the vehicle can be started according to the driver's intention to start the vehicle.

SUMMARY

It is desirable to suppress the start of a vehicle when a driver erroneously operates an accelerator pedal while a parking brake is operating.

An object of the present disclosure is to provide a vehicle control device that can more reliably suppress the start of the vehicle when an erroneous accelerator pedal operation is performed while the parking brake is operating.

In order to solve the above issue, a vehicle control device according to an aspect of the present disclosure includes: a determination unit that determines that when an accelerator pedal is operated while an electric parking brake of a vehicle is operating, an operation of the accelerator pedal is an erroneous operation based on an opening and closing status of a door of the vehicle, a fastening status of a seatbelt, and an operation status of a brake pedal; and a control unit that executes at least one of control for operating a hydraulic brake of the vehicle and control for suppressing a vehicle driving force when determination is made that the operation of the accelerator pedal is an erroneous operation.

According to the present disclosure, it is possible to provide a vehicle control device that can more reliably suppress the start of the vehicle when the erroneous accelerator pedal operation is performed while the parking brake is operating.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
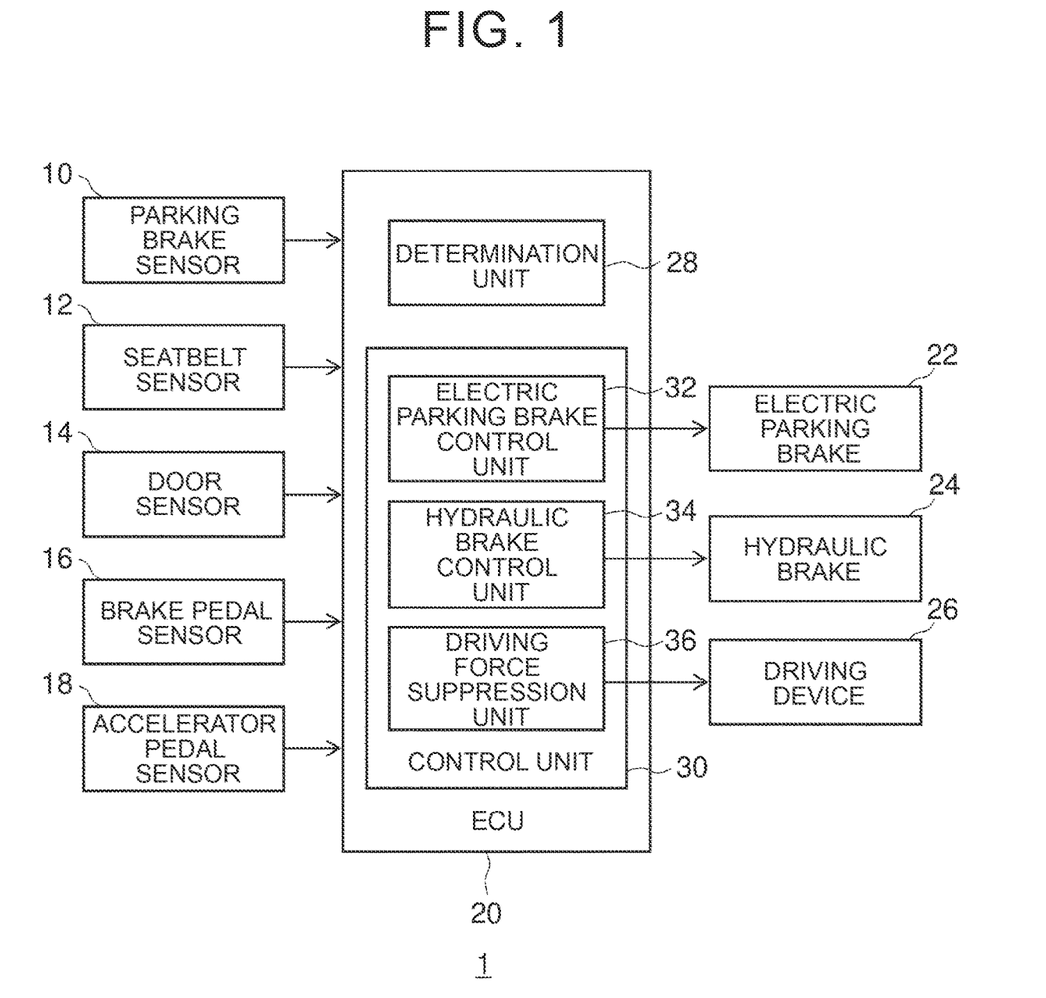
FIG. 1 is a diagram schematically showing the configuration of a vehicle control device according to an embodiment.

FIG. 1 schematically shows the configuration of a vehicle control device 1 according to an embodiment. The vehicle control device 1 is mounted on a vehicle (not shown). The vehicle control device 1 includes a parking brake sensor 10, a seatbelt sensor 12, a door sensor 14, a brake pedal sensor 16, an accelerator pedal sensor 18, an Electronic Control Unit (ECU) 20, an Electric Parking Brake (EPB) 22, a hydraulic brake 24, and a driving device 26. Hereinafter, the electric parking brake may also be referred to as EPB.

The electric parking brake 22 is electrically operated to apply braking force for parking to the wheels of the vehicle. When an EPB switch (not shown) provided inside the vehicle cabin is turned on, the ECU 20 operates the electric parking brake 22. When the EPB switch is turned off, the ECU 20 releases the electric parking brake 22. Hereinafter, the state in which the electric parking brake 22 is operating is also referred to as the locked state. A state in which the electric parking brake 22 is released is also called a released state. The electric parking brake 22 may be, for example, a motor-on caliper type provided in the caliper of the rear wheel of the vehicle, or may be a wire-driven type.

Hydraulic brakes 24 apply hydraulic braking force to each wheel of the vehicle. Although not shown, hydraulic brake 24 has a caliper for each wheel, a brake pedal, and a hydraulic actuator. The hydraulic actuator adjusts the brake fluid pressure supplied to the wheel cylinder inside the caliper according to the amount of depression of the brake pedal by the driver, and presses the brake pads against the disc by operating the wheel cylinder with the fluid pressure. As a result, the hydraulic brake 24 generates a hydraulic braking force.

The driving device 26 outputs a vehicle driving force for running the vehicle. The vehicle driving force can also be called driving torque. Driving device 26 includes, for example, at least one of an internal combustion engine and a motor. The driving device 26 can generate a driving force according to the amount of operation of the accelerator pedal.

The parking brake sensor 10 detects the operating state of the electric parking brake 22 and outputs the detection result to the ECU 20.

The seatbelt sensor 12 detects whether or not the seatbelt of the driver's seat of the vehicle is attached or detached, and outputs the detection result to the ECU 20.

The door sensor 14 detects the open/closed state of the door of the driver's seat of the vehicle and outputs the detection result to the ECU 20.

The brake pedal sensor 16 detects the operating state of the brake pedal of the vehicle and outputs the detection result to the ECU 20.

The accelerator pedal sensor 18 detects the operation state of the accelerator pedal of the vehicle and outputs the detection result to the ECU 20.

The ECU 20 has a determination unit 28 and a control unit 30. The configuration of the ECU 20 can be implemented in terms of hardware by a CPU, memory, and other LSIs of any computer, and in terms of software is implemented by a program or the like loaded into the memory. Here, the functional blocks realized by their cooperation are drawn. Therefore, those skilled in the art will understand that the functional blocks can be realized in various forms by hardware only, software only, or a combination thereof.

The determination unit 28 acquires detection results supplied from various sensors such as the parking brake sensor 10, determines whether the acquired detection results satisfy various conditions described later, and supplies the determination results to the control unit 30.

Control unit 30 controls electric parking brake 22, hydraulic brake 24, and driving device 26 based on the determination result supplied from determination unit 28. The control unit 30 has an electric parking brake control unit 32, a hydraulic brake control unit 34 and a driving force suppression unit 36.

The electric parking brake control unit 32 can operate or release the electric parking brake 22 by controlling the motor of the electric parking brake 22.

The hydraulic brake control unit 34 can control the hydraulic pressure of the hydraulic brake 24 by controlling the hydraulic actuator to activate or release the hydraulic brake 24.

The driving force suppression unit 36 can suppress the vehicle driving force generated by the driving device 26. When the control for suppressing the vehicle driving force is executed, the driving device 26 does not increase the vehicle driving force even if the accelerator pedal is operated. That is, the driving device 26 does not generate the vehicle driving force in response to the operation of the accelerator pedal during the driving force suppression control. For example, when the vehicle driving force suppression control is executed while the internal combustion engine is idling, the driving device 26 continues idling regardless of the amount of operation of the accelerator pedal.

First, control when the electric parking brake 22 is in operation will be described.

The determination unit 28 determines whether the driver intends to get off the vehicle based on the open/closed state of the door of the driver's seat, the wearing state of the seat belt of the driver's seat, and the operating state of the brake pedal. Specifically, when the door of the driver's seat is open, the seatbelt of the driver's seat is not fastened, and the brake pedal is not operated, the determination unit 28 determines that the driver intends to get off the vehicle. If at least one of the conditions that the door of the driver's seat is closed, that the seat belt of the driver's seat is fastened, and that the brake pedal is being operated is satisfied, the determination unit 28 determines that the driver is not getting off the vehicle.

If the accelerator pedal is operated while the electric parking brake 22 is in operation, the determination unit 28 determines that the operation of the pedal is an erroneous operation based on the open/closed state of the driver's seat door, the wearing state of the seat belt in the driver's seat, and the operating state of the brake pedal. Specifically, when the accelerator pedal is operated while the electric parking brake 22 is operating, the determination unit 28 determines that the driver's door is open, the seat belt of the driver's seat is not fastened, and the brake pedal is not operated, it is determined that the operation of the accelerator pedal is an erroneous operation. That is, when the accelerator pedal is operated while the electric parking brake 22 is operating, the determination unit 28 determines that the accelerator pedal operation is an erroneous operation if it determines that the driver intends to get off the vehicle. When the accelerator pedal is operated while the electric parking brake 22 is operating, the determination unit 28 determines that the accelerator pedal operation is not an erroneous operation if it determines that the driver does not intend to get off the vehicle.

When it is determined that the operation of the accelerator pedal is an erroneous operation, that is, when the start is inappropriate, the control unit 30 executes at least one of the control for operating the hydraulic brake 24 and the control for suppressing the vehicle driving force of the driving device 26 while maintaining the electric parking brake 22 in a locked state, while the accelerator pedal is operated. In this case, it is preferable that the control unit 30 performs both control for operating the hydraulic brake 24 and control for suppressing the vehicle driving force.

Further, the determination unit 28 determines whether the driver is seated based on the open/closed state of the door of the driver's seat and the wearing state of the seat belt of the driver's seat. Specifically, the determination unit 28 determines that the driver is seated when the door of the driver's seat is closed and the seat belt of the driver's seat is fastened. The determination unit 28 determines that the driver is not seated when at least one of the condition that the door of the driver's seat is open and that the seat belt of the driver's seat is not fastened is satisfied.

When it is determined that the operation of the accelerator pedal is not an erroneous operation, the control unit 30 releases the electric parking brake 22 if the door of the driver's seat is closed and the seat belt of the driver's seat is fastened. That is, if it is determined that the driver is seated, the electric parking brake 22 is released.

When it is determined that the operation of the accelerator pedal is not erroneous and the driver is not seated, the control unit 30 outputs a warning via an output unit (not shown) and locks the electric parking brake 22. The output includes, for example, a display in the instrument panel of the vehicle. The output unit displays, in the instrument panel, the warning for releasing the EPB, for example, "Unable to release EPB. Close the door and fasten your seatbelt". The output unit may output the warning by voice.

Figure 2A:
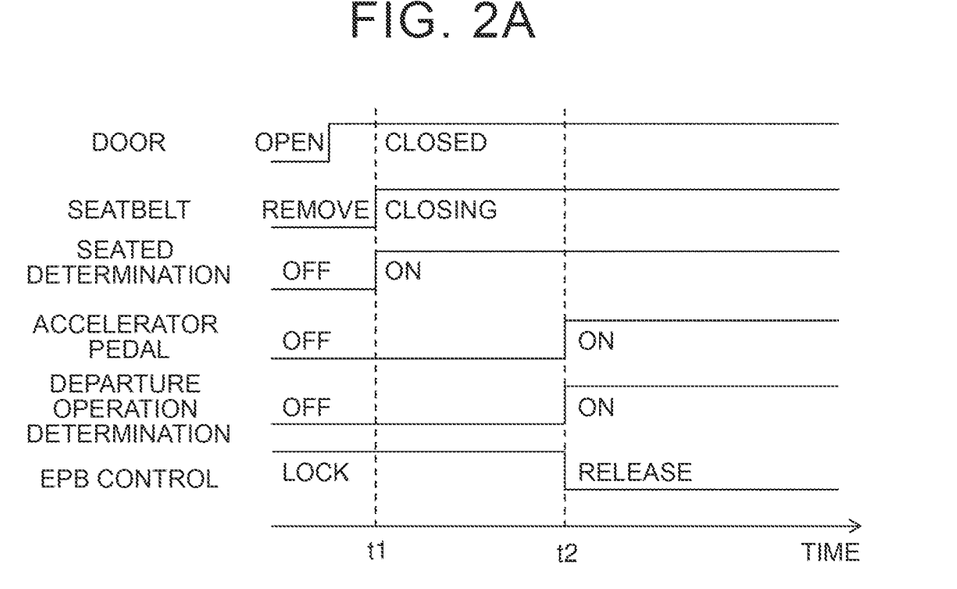
FIG. 2A is a timing chart for explaining the operation of the vehicle control device of FIG. 1.
Figure 2B:
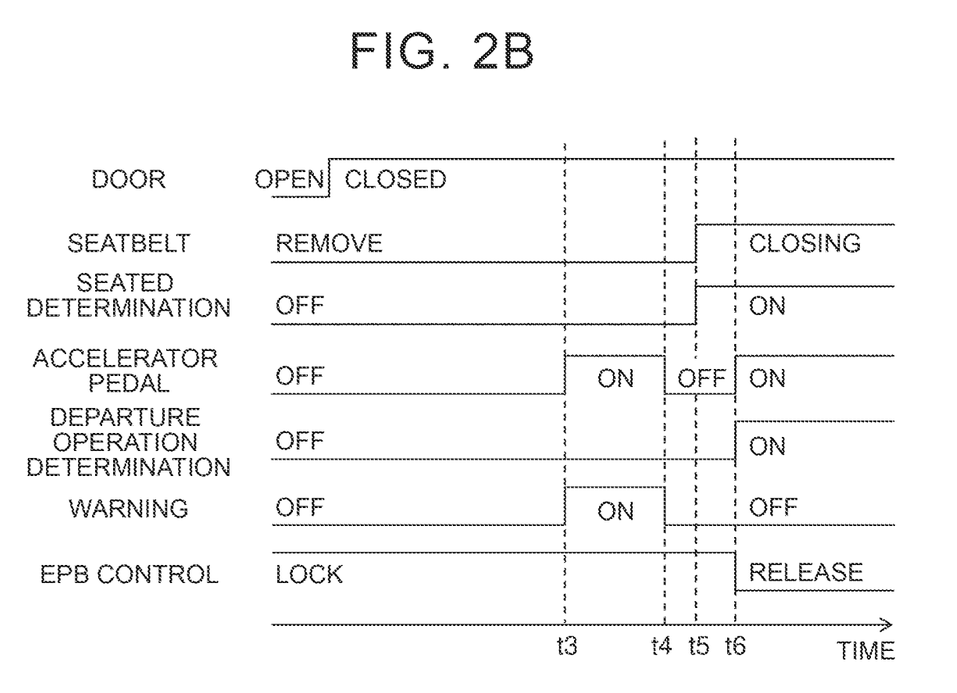
FIG. 2B is a timing diagram for explaining the operation of the vehicle control device of FIG. 1.

FIGS. 2A and 2B are timing charts for explaining the operation of the vehicle control device 1 of FIG. 1. FIG. 2A shows, for example, a situation in which the electric parking brake 22 is automatically released by the driver's operation of the accelerator pedal after the driver gets into the stopped vehicle with the electric parking brake 22 in operation.

When the door of the driver's seat is closed and the seat belt of the driver's seat is tightened at time t1, the determination unit 28 determines that the driver is seated and turns on the seating determination. Although not shown, the determination unit 28 determines that the driver does not intend to get off the vehicle.

At time t2 thereafter, when the operation of the accelerator pedal is turned on, the determination unit 28 turns on the start operation determination. When the seating determination is ON and the operation of the accelerator pedal is ON, the determination unit 28 turns on the starting operation determination. In response, control unit 30 releases electric parking brake 22.

In this manner, the electric parking brake 22 can be released by operating the accelerator pedal without operating the EPB switch, so convenience can be enhanced. At this time, the driving force of the vehicle is not limited, so that the release of the electric parking brake 22 can prevent the vehicle from rolling down on an inclined road such as a slope.

FIG. 2B shows a situation in which a warning is output by operating the accelerator pedal after the driver gets into the stopped vehicle with the electric parking brake 22 in operation.

When the driver's seat door is closed and the accelerator pedal is turned on at time t3 with the driver's seat belt unfastened, the determination unit 28 turns off the starting operation determination because the seating determination is off. In response to this, the control unit 30 outputs a warning. The warning can prompt the driver to close the door and fasten the seat belt. When the operation of the accelerator pedal is turned off at time t4 after that, the control unit 30 stops outputting the warning.

When the seat belt of the driver's seat is fastened at time t5 after that, the determination unit 28 turns on the seating determination. At time t6 after that, when the operation of the accelerator pedal is turned on, the determination unit 28 turns on the start operation determination. As a result, the control unit 30 releases the electric parking brake 22.

Figure 3:
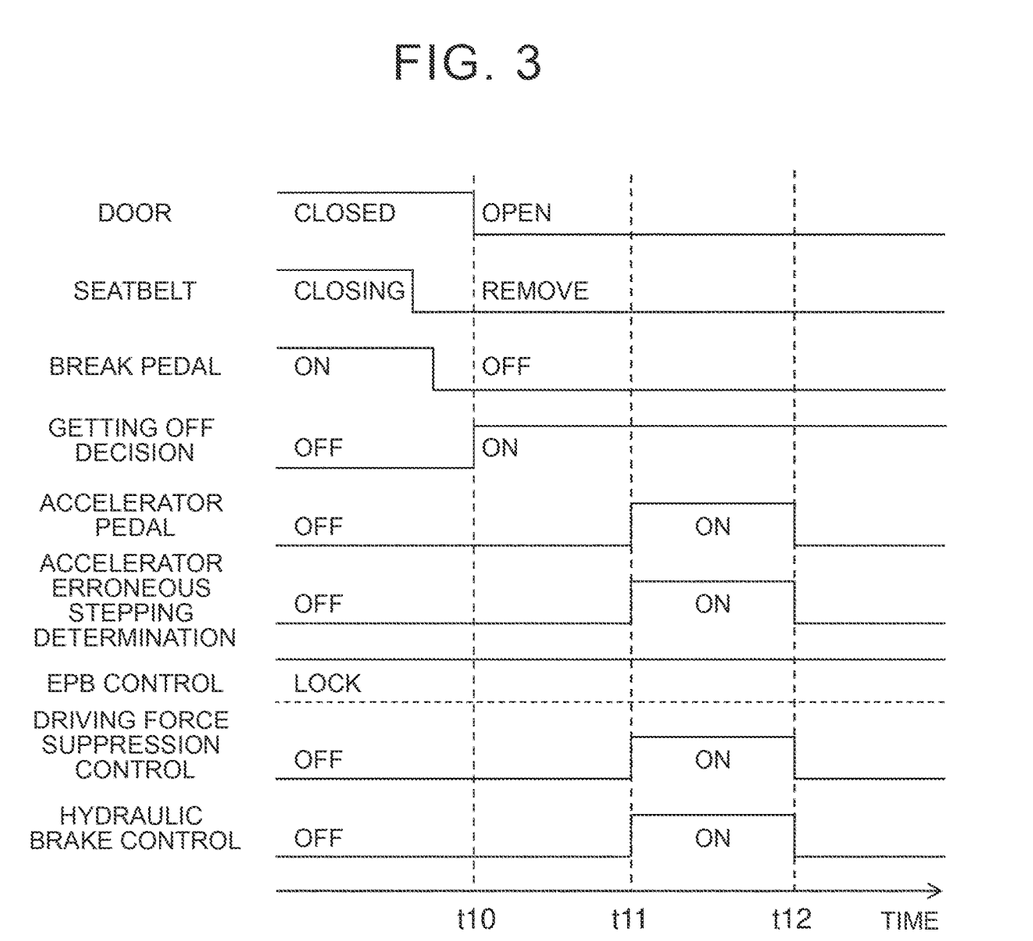
FIG. 3 is another timing chart for explaining the operation of the vehicle control device of FIG. 1.

FIG. 3 is another timing chart for explaining the operation of the vehicle control device 1 of FIG. 1. FIG. 3 shows, for example, a situation in which the driver has stopped the vehicle and is about to exit the vehicle after operating the EPB switch.

When the seat belt of the driver's seat is released, the operation of the brake pedal is turned off, and the door of the driver's seat is opened at time t10, the determination unit 28 determines that the driver intends to get off the vehicle, and turns on the determination of getting off the vehicle.

When the operation of the accelerator pedal is turned on at time t11 after that, since it is determined that the driver intends to get off the vehicle, the determination unit 28 determines that the operation of the accelerator pedal is an erroneous operation, and determines that the accelerator is erroneously depressed. This makes it possible to determine that the operation of the accelerator pedal when the driver is about to get off the vehicle is an erroneous operation.

Since it is determined that the operation of the accelerator pedal is an erroneous operation, the control unit 30 operates the hydraulic brakes 24 to apply hydraulic braking force to the four wheels while maintaining the electric parking brakes 22 in the locked state, and further control to suppress the vehicle driving force is executed.

In this manner, even if the driver who is about to get off the vehicle accidentally depresses the accelerator pedal for some reason while trying to depress the brake pedal at time t11, the hydraulic brake 24 is operated in addition to the electric parking brake 22. Since the vehicle driving force is suppressed, the start of the vehicle can be suppressed. For example, in the case of a vehicle with a relatively large driving output of the internal combustion engine or motor, it may be difficult to stop and hold the vehicle when the accelerator pedal is erroneously operated only by operating the electric parking brake 22. In the embodiment, when the driver tries to get off the vehicle while the electric parking brake 22 is in operation, even if the accelerator pedal is erroneously stepped on, it is possible to suppress with certainty the start of the vehicle, regardless of the magnitude of the drive output of the internal combustion engine or the motor. Therefore, safety can be improved.

When the operation of the accelerator pedal is turned off at time t12 thereafter, the determination unit 28 turns off the accelerator erroneous depression determination. Accordingly, the control unit 30 turns off the control for operating the hydraulic brake 24 and turns off the control for suppressing the vehicle driving force. Therefore, it is possible to perform control to operate the hydraulic brake 24 only for a necessary period and control to suppress the vehicle driving force.

Figure 4:
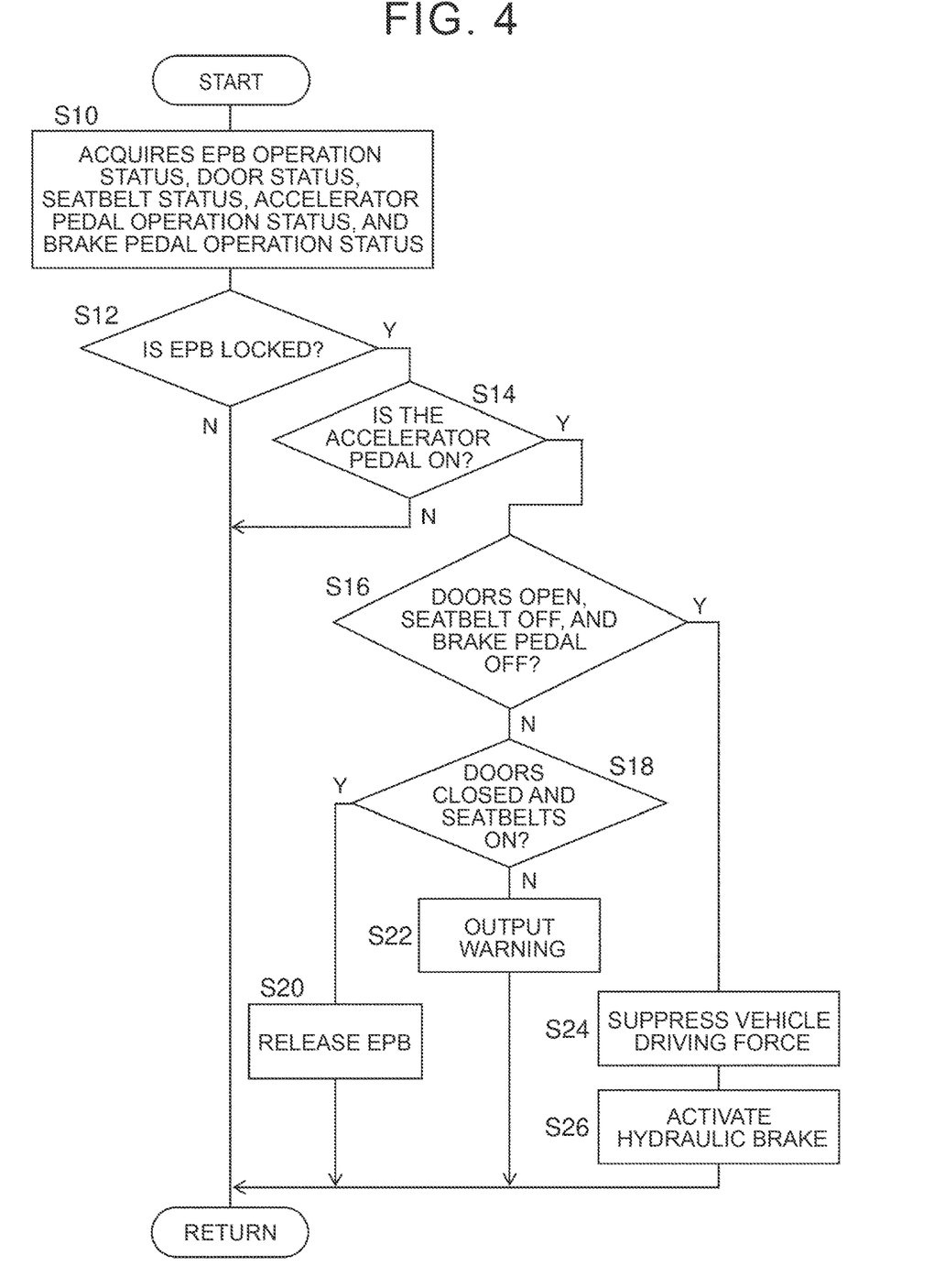
FIG. 4 is a flowchart showing the processing of the ECU of FIG. 1.

FIG. 4 is a flowchart showing the processing of the ECU 20 of FIG. 1. The processing in FIG. 4 is repeatedly executed. The determination unit 28 acquires the EPB operating state, the door state, the seat belt state, the accelerator pedal operating state, and the brake pedal operating state (S10).

If the EPB is not locked (N of S12), the process returns to S10. If the electric parking brake 22 is locked (Y of S12) and the accelerator pedal is not on (N of S14), the process returns to S10. If the accelerator pedal is on (Y of S14), the door of the driver's seat is open, the seat belt of the driver's seat is unfastened, and the brake pedal is off (Y of S16), the control unit 30 suppresses the vehicle driving force (S24), actuates the hydraulic brake 24 (S26), and the process returns to S10.

If the condition of S16 is not satisfied (N of S16), the door of the driver's seat is closed and the seat belt of the driver's seat is fastened (Y of S18), the control unit 30 operates the electric parking brake 22 is released (S20), and the process returns to S10. If the condition of S18 is not satisfied (N of S18), the control unit 30 outputs a warning (S22), and the process returns to S10.

Next, control when the electric parking brake 22 is released will be described. When the electric parking brake 22 is released, the door of the driver's seat is open, the seatbelt of the driver's seat is not fastened, and the brake pedal is not operated, the control unit 30 applies the electric parking brake 22, and at least one of control to operate the hydraulic brake 24 and control to suppress the vehicle driving force is executed. In other words, the control unit 30 executes the control described above when determining that the electric parking brake 22 is released and that the driver intends to get off the vehicle. In this case, it is preferable that the control unit 30 performs both control for operating the hydraulic brake 24 and control for suppressing the vehicle driving force.

Figure 5:
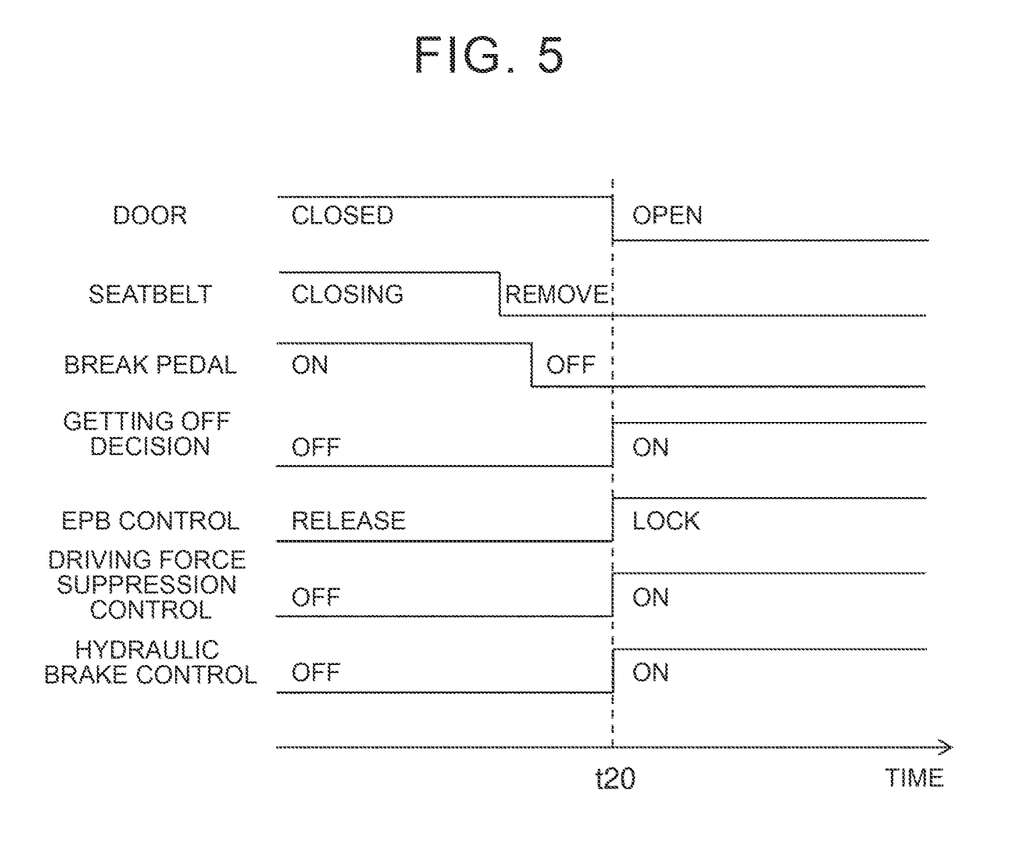
FIG. 5 is yet another timing diagram for explaining the operation of the vehicle control device of FIG. 1.

FIG. 5 is still another timing chart for explaining the operation of the vehicle control device 1 of FIG. 1. FIG. 5 shows, for example, a situation in which the driver has stopped the vehicle and is about to exit without operating the EPB switch.

When the seat belt of the driver's seat is released, the operation of the brake pedal is turned off, and the door of the driver's seat is opened at time t20, the determination unit 28 turns on the get-off determination. Since the electric parking brake 22 is released when the get-off determination is turned on, the control unit 30 controls the electric parking brake 22 to be in a locked state, executes control to operate the hydraulic brake 24, and executes control to suppress the vehicle driving force.

As a result, for example, after time t20, even if the driver who is about to get off the vehicle accidentally depresses the accelerator pedal for some reason, the hydraulic brake 24 as well as the electric parking brake 22 is actuated. Furthermore, since the vehicle driving force is suppressed, the starting of the vehicle can be suppressed. As described above, for example, in the case of a vehicle with a relatively large driving output of the internal combustion engine or motor, it may be difficult to keep the vehicle stopped when the accelerator pedal is erroneously operated only by operating the electric parking brake 22. In the embodiment, regardless of the magnitude of the driving output of the internal combustion engine or the motor, the start of the vehicle can be suppressed more reliably even if the accelerator pedal is erroneously stepped on when the driver attempts to exit the vehicle while the electric parking brake 22 is released.

Figure 6:
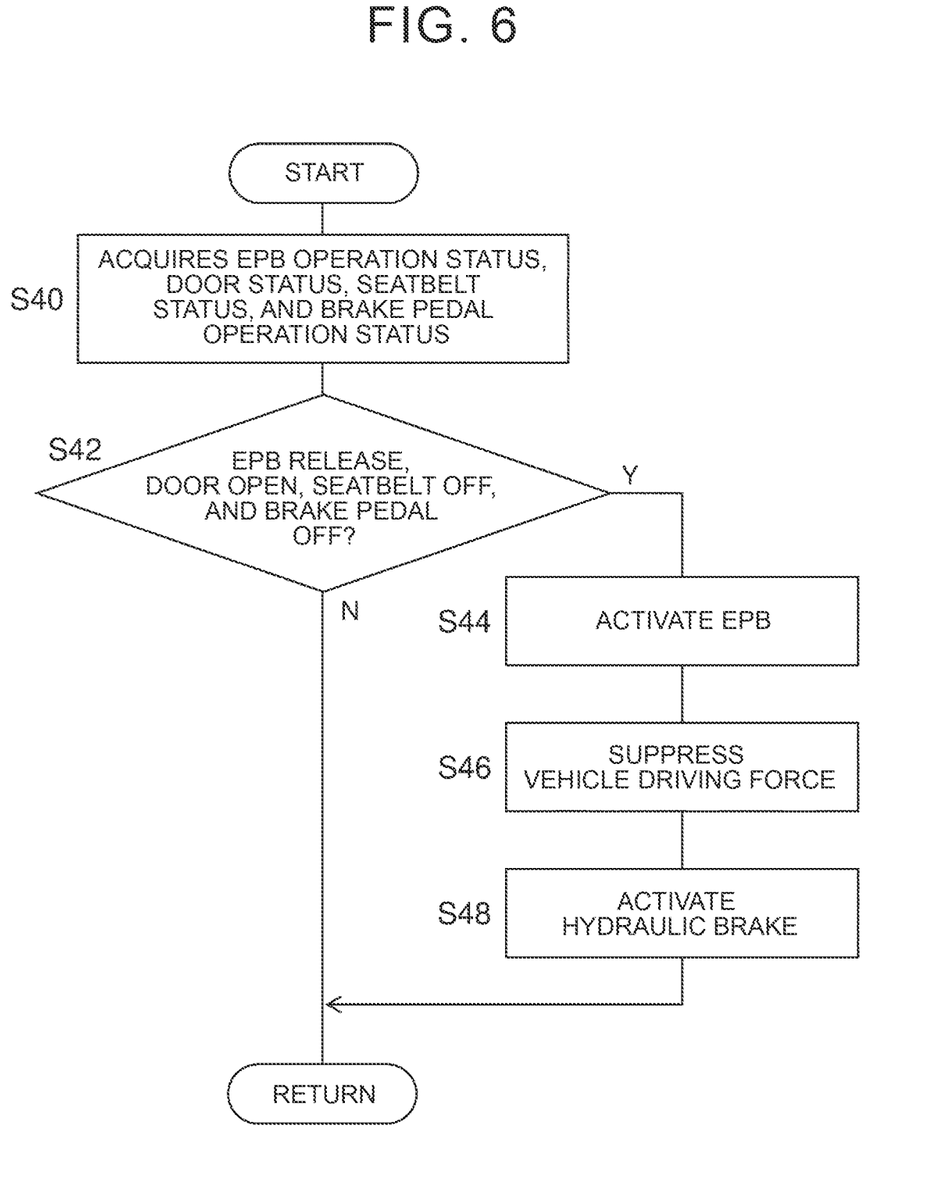
FIG. 6 is a flowchart showing another process of the ECU in FIG. 1.

FIG. 6 is a flowchart showing another process of the ECU 20 of FIG. 1. The processing in FIG. 6 is repeatedly executed in parallel with the processing in FIG. 4. The determination unit 28 acquires the EPB operation state, the door state, the seat belt state, and the brake pedal operation state (S40).

When the electric parking brake 22 is released, the door of the driver's seat is open, the seat belt of the driver's seat is unfastened, and the brake pedal is off (Y in S42), the control unit 30 The parking brake 22 is operated (S44), the vehicle driving force is suppressed (S46), the hydraulic brake 24 is operated (S48), and the process returns to S10. If the condition of S42 is not satisfied (N of S42), the process returns to S10.

The present disclosure has been described above based on the embodiment. It should be understood by those skilled in the art that the embodiment is merely an example, and that various modifications are possible in combination of each component and each process, and that such modifications are within the scope of the present disclosure.

What is claimed is:

1. A vehicle control device comprising:
 a determination unit that determines that when an accelerator pedal is operated while an electric parking brake of a vehicle is operating, an operation of the accelerator pedal is an erroneous operation based on an opening and closing status of a door of the vehicle, a fastening status of a seatbelt, and an operation status of a brake pedal; and
 a control unit that executes at least one of control for operating a hydraulic brake of the vehicle and control for suppressing a vehicle driving force when determination is made that the operation of the accelerator pedal is an erroneous operation.

2. The vehicle control device according to claim 1, wherein when the accelerator pedal is operated while the electric parking brake is operating, the door is open, the seatbelt is not fastened, and the brake pedal is not operated, the determination unit determines that the operation of the accelerator pedal is an erroneous operation.

3. The vehicle control device according to claim 1, wherein when determination is made that the operation of the accelerator pedal is an erroneous operation, the control unit executes at least one of the control for operating the hydraulic brake and the control for suppressing the vehicle driving force while the accelerator pedal is being operated.

4. The vehicle control device according to claim 1, wherein when determination is made that the operation of the accelerator pedal is not an erroneous operation, the door is closed, and the seatbelt is fastened, the control unit releases the electric parking brake.

5. The vehicle control device according to claim 1, wherein when the electric parking brake is released, the door is open, the seatbelt is not fastened, and the brake pedal is not operated, the control unit operates the electric parking brake, and executes at least one of the control for operating the hydraulic brake and the control for suppressing the vehicle driving force.

\* \* \* \* \*